(12) United States Patent
Goebel

(10) Patent No.: US 7,050,950 B2
(45) Date of Patent: May 23, 2006

(54) SYSTEM, METHOD AND COMPUTER PRODUCT FOR INCREMENTAL IMPROVEMENT OF ALGORITHM PERFORMANCE DURING ALGORITHM DEVELOPMENT

(75) Inventor: Kai Frank Goebel, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 848 days.

(21) Appl. No.: 09/683,020

(22) Filed: Nov. 8, 2001

(65) Prior Publication Data
US 2003/0093250 A1    May 15, 2003

(51) Int. Cl.
*G06F 17/10* (2006.01)
(52) U.S. Cl. .................. 703/2; 703/6; 703/22; 700/97; 706/47
(58) Field of Classification Search .................. 703/2, 703/6, 22; 700/97; 706/47
See application file for complete search history.

(56) References Cited

U.S. PATENT DOCUMENTS

| | | | |
|---|---|---|---|
| 6,381,564 B1* | 4/2002 | Davis et al. ................... | 703/2 |
| 6,604,092 B1* | 8/2003 | Stewart ....................... | 706/47 |
| 6,725,112 B1* | 4/2004 | Kaminsky et al. ............ | 700/97 |
| 2002/0128805 A1* | 9/2002 | Goldman et al. ............. | 703/2 |
| 2002/0183986 A1* | 12/2002 | Stewart et al. ................ | 703/2 |
| 2004/0064296 A1* | 4/2004 | Saxena et al. ................ | 703/2 |

OTHER PUBLICATIONS

"Conducting Experiments With Experiment Manager", M. Angel, pp. 535-541, Proceedings 1996 Winter Simulation Conference ACM 1996.*
"Design-Ease Software Version 6 User's Guide" Stat-Ease Inc. Copyright 2000.*
"Designing Simulation Experiments: Taguci Methods and Response Surface Metamodels", Ramsberg et al, Proceedings 1991 Winter Simulation Conference, pp 167-176, ACM 1991.*
"Regression Metamodels and Design of Experiments", van Groenendall et al, Proceedings 1996 Winter Simulation Conference, pp 1433-1439, ACM 1996.*
"Process Optimization Using Design of Experiments", Porter et al, Pharmaceutical Technology, Oct. 1997.*
"Validation of Models: Statistical Techniques and Data Availability", Kleijnen, Proceedings 1999 Winter Simulation Conference, pp. 647-654, ACM 1999.*
"Systems for Monte Carlo Work", Grier, Proceedings 1987 Winter Simulation Conference, pp. 428-433, ACM 1987.*
"Design of Experiments in BDD Variable Ordering: Lessons Learned", Harlow et al, ICCADA 98', pp. 646-652, ACM 1998.*
"Leveraging the Design Chain", White Paper, ANSYS Inc. 2002.*

(Continued)

*Primary Examiner*—Fred Ferris
(74) *Attorney, Agent, or Firm*—Fletcher Yoder

(57) ABSTRACT

System, method and computer product for incremental improvement of algorithm performance during algorithm development. In one aspect of this disclosure, there is a system, method and computer readable medium that stores instructions for instructing a computer system, to assess the performance of an algorithm during development. In this embodiment, a design of experiments component establishes an acceptable number of experiments for analyzing incremental improvements of the algorithm. An experiment performance component runs the established number of experiments for the algorithm. A simulation component simulates the behavior of the algorithm using results from the experiment performance component.

72 Claims, 7 Drawing Sheets

OTHER PUBLICATIONS

Design-Ease Software, Version 6.0, Product Specification, 2001.*

"State of Mathmatical Modeling and Simualtion in the finnish Process Industry, Universities and Research Centres", Klemola et al, Technology Review 2001.*

Kai Goebel, "Architecture and Design of a Diagnostic Information Fusion System", Artificial Intelligence for Engineering Design, Analysis and Manufacturing (2001), 15, pp. 335-348.

* cited by examiner

48

SYSTEM, METHOD AND COMPUTER PRODUCT FOR INCREMENTAL IMPROVEMENT OF ALGORITHM PERFORMANCE DURING ALGORITHM DEVELOPMENT

FEDERAL RESEARCH STATEMENT

The US Government may have certain rights in this disclosure pursuant to Government Contract Number MDA 972-98-3-0002 awarded by the Defense Advanced Research Projects Agency (DARPA).

BACKGROUND OF INVENTION

This disclosure relates generally to algorithm development and more particularly to assessing the performance of an algorithm at different phases of development and assessing the impact that input variations have on the algorithm.

Generally, an algorithm undergoes several validations during the course of its development. Validation is the systematic evaluation of the algorithm performance. The evaluation includes performing reviews and tests to ensure that functional requirements are complete and testable. Generally, a review is a form of inspection that includes reviewing documentation to make sure that it supports operation, maintenance and future enhancements. In addition, the review includes determining whether established requirements, design concepts and specification have been met. Generally, a test includes operating the algorithm with real or simulated inputs to demonstrate that it satisfies the functional requirements. Typically, during a test, various test cases having selected input data and parameters are used as inputs to the algorithm. Outputs and reactions of the algorithms are then noted. Test failures are used to identify the specific differences between expected and actual results.

There are several drawbacks associated with the above-noted process for validating algorithms. Most notably, when the choice of algorithms to be implemented is not known a priori, for example because the algorithms are tasked with solving a new problem that has no known benchmark solution, the impact of newly developed parts of the algorithm on solving the stated problem cannot easily be judged. In addition, if the problem domain is poorly known, algorithmic solutions are carried without the benefit of knowing exactly the impact on the unknown parts of the problem domain. This predicament is compounded by several factors such as increasing complexity of the problem domain, multiple boundary conditions, and permutation of possible cases.

In order to overcome the above drawbacks, there is a need for a methodology that allows a software developer to assess the performance of an algorithm at different phases of development and assess the impact that input variations will have on the algorithm.

SUMMARY OF INVENTION

In one aspect of this disclosure, there is a system, method and computer readable medium that stores instructions for instructing a computer system, to assess the performance of an algorithm during development. In this embodiment, a design of experiments component establishes an acceptable number of experiments for analyzing the algorithm. An experiment performance component runs the established number of experiments for the algorithm. A simulation component simulates the behavior of the algorithm using results from the experiment performance component.

In another aspect of this disclosure, there is a system, method and computer readable medium that stores instructions for instructing a computer system, to assess the performance of an algorithm during development. In this embodiment, a design of experiments component establishes an acceptable number of experiments for analyzing the algorithm. An experiment performance component runs the established number of experiments for the algorithm. A simulation component simulates the behavior of the algorithm using results from the experiment performance component. A simulation performance component evaluates the performance of the simulation for the algorithm.

In a third aspect of this disclosure, there is a system, method and computer readable medium that stores instructions for instructing a computer system, to assess the performance of an algorithm during development. In this embodiment, a design of experiments component establishes an acceptable number of experiments for analyzing the algorithm. An experiment performance component runs the established number of experiments for the algorithm and uses a performance metric to evaluate the results of the experiments. A Monte Carlo simulation component simulates the behavior of the algorithm using results from the experiment performance component with a Monte Carlo simulation. A simulation performance component evaluates the performance of the Monte Carlo simulation for the algorithm.

In still another aspect of this disclosure, there is a system, method and computer readable medium that stores instructions for instructing a computer system, to assess the performance of an algorithm during development. In this embodiment, a design of experiments component establishes an acceptable number of experiments for analyzing the algorithm. An experiment performance component runs the established number of experiments for the algorithm. A performance metric component evaluates the results of the experiments run for the algorithm. An algorithm adjustment component adjusts logic or parameters of the algorithm for unacceptable results.

In a fifth aspect of this disclosure, there is a system, method and computer readable medium that stores instructions for instructing a computer system, to assess the performance of an algorithm during development. In this embodiment, a Monte Carlo simulation component simulates the behavior of the algorithm with a Monte Carlo simulation, wherein the Monte Carlo simulation component uses at least one confusion matrix to simulate the behavior of the algorithm. A simulation performance component evaluates the performance of the Monte Carlo simulation for the algorithm. An algorithm adjustment component adjusts logic or parameters of the algorithm for unacceptable results.

DETAILED DESCRIPTION

Figure 1:
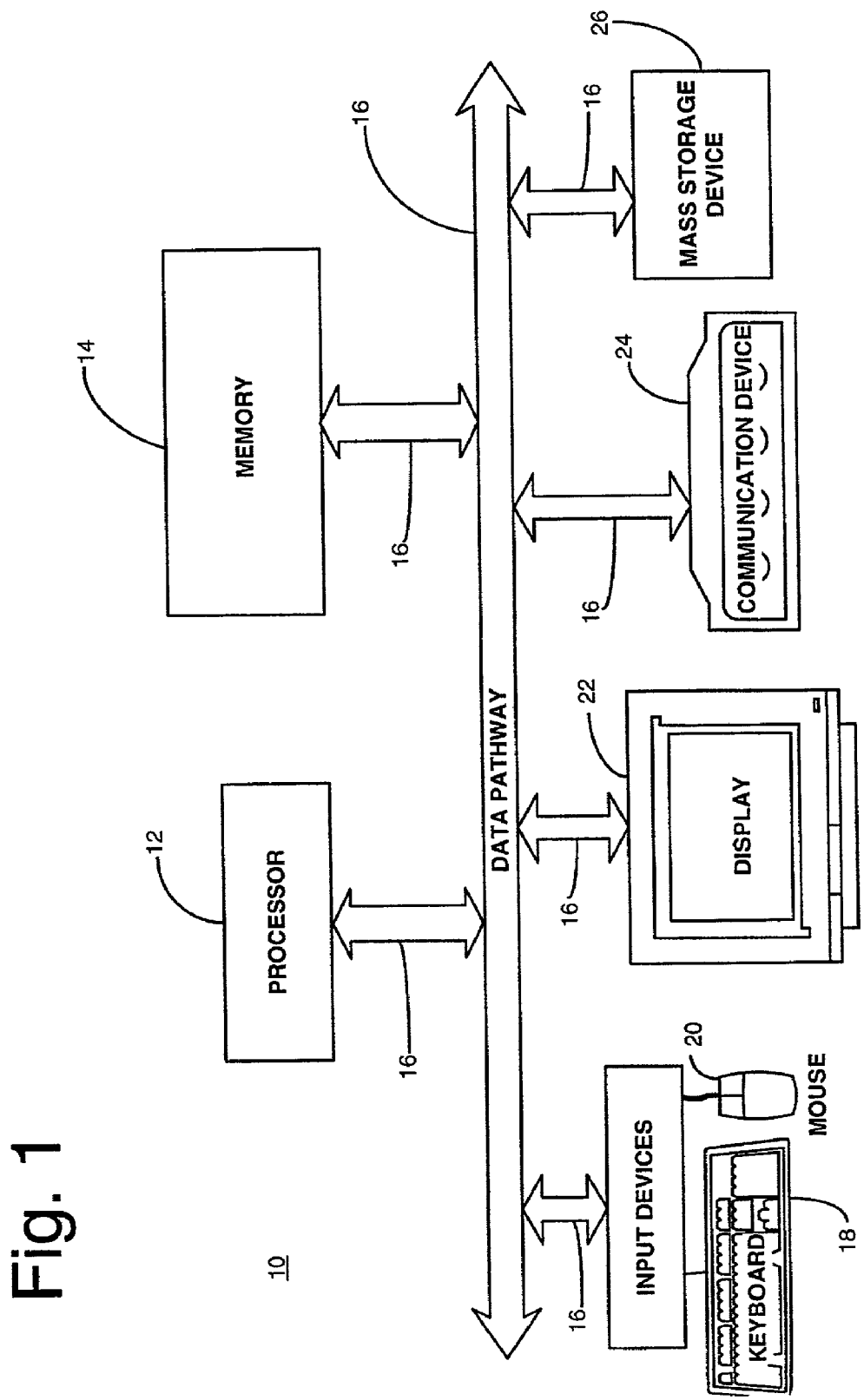
FIG. 1 shows a schematic diagram of a general-purpose computer system in which a system for assessing the performance of an algorithm operates.

This disclosure describes a system, method and computer product for assessing the performance of an algorithm during its development. FIG. 1 shows a schematic diagram of a general-purpose computer system 10 in which a system for assessing the performance of an algorithm operates. The computer system 10 generally comprises a processor 12, memory 14, input/output devices, and data pathways (e.g., buses) 16 connecting the processor, memory and input/output devices. The processor 12 accepts instructions and data from memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. Also, a display 22 may be used to allow a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, Digital Subscriber Line (DSL) adapter or wireless access card, enables the computer system 10 to access other computers and resources on a network such as a LAN, wireless LAN or wide area network (WAN). A mass storage device 26 may be used to allow the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, notebook computer, personal computer, workstation, mini-computer, mainframe computer or supercomputer.

Figure 2:
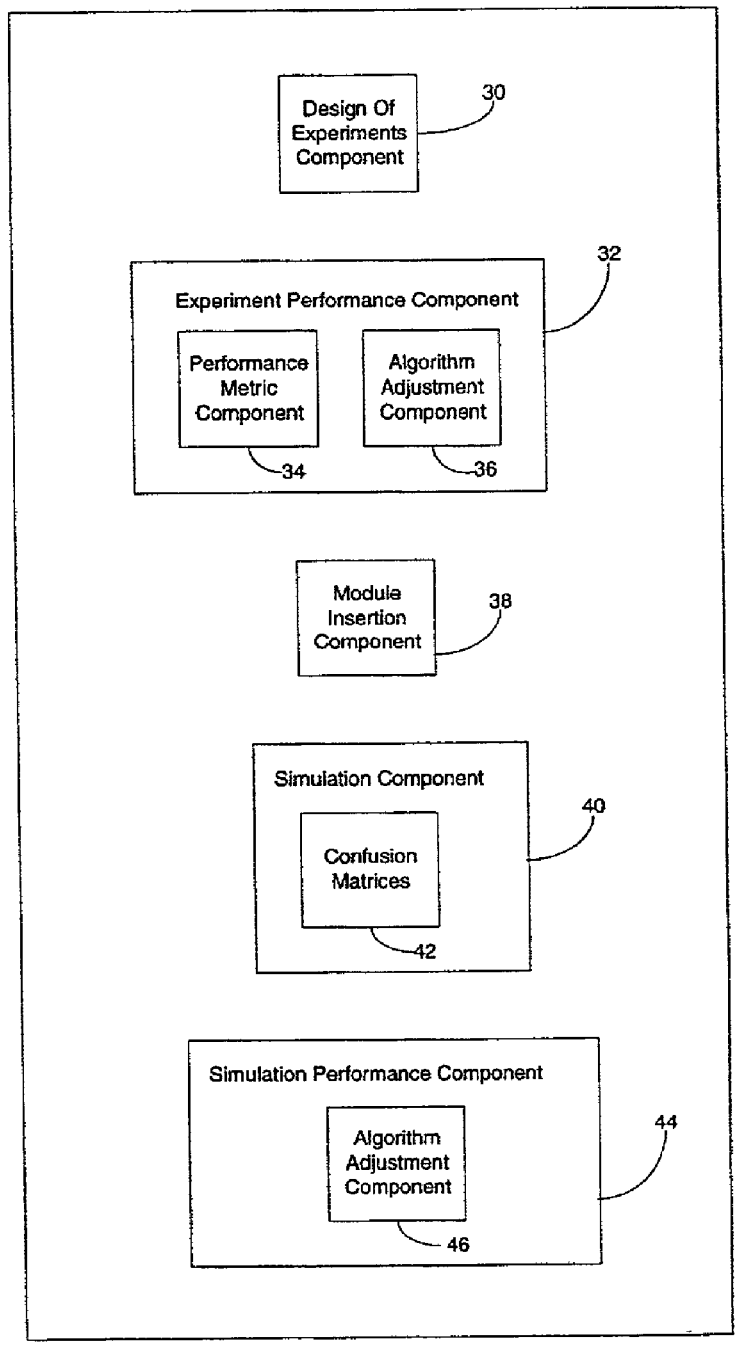
FIG. 2 shows a top-level component architecture diagram of an algorithm performance assessment system that operates on the computer system shown in FIG. 1.

FIG. 2 shows a top-level component architecture diagram of an algorithm performance assessment system 28 that operates on the computer system 10 shown in FIG. 1. The algorithm performance assessment system comprises a Design of Experiments (DoE) component 30 that establishes an acceptable number of experiments for analyzing an algorithm under development. The DoE is a well-known technique for mathematically selecting and analyzing experimental results to efficiently gather information relating a process response to selected independent variables. Generally, the DoE comprises steps such as defining a problem, establishing an objective, selecting response variable(s), selecting independent variable(s), choosing variable levels, selecting an experiment design, running the experiment and collecting data, analyzing the data and drawing conclusions. As one of ordinary skill in the art will recognize, these steps are dependent upon the particular application of the algorithm that is being developed.

In this disclosure, the DoE component 30 establishes the acceptable number of experiments based upon a selected subset of a design space defined by an expert. In this disclosure, the design space is the space described by the variables and parameters or logic that are input to the algorithm to be designed. The logic or parameters can be the output from systems that are part of the process before the algorithm to be designed. The acceptable number of experiments determined by the DoE component 30 generally depends on the level of accuracy desired and is further constrained by resource limitations such as financial resources or time resources. For example, using the DoE component 30 allows tailoring the number of solutions that the expert has to evaluate to the expert time available with a trade-off on accuracy. The DoE component 30 also selects an appropriate level of experiments for analyzing the algorithm. Generally, there are three levels of DoE; 1) full factorial, 2) fractional factorial or 3) screening. A full factorial experiment allows all combinations of all variables to be tested, while a fractional (e.g., half) factorial experiment allows many factors to be assessed simultaneously with reasonable economy of effort and a screening DoE isolates a "vital few" variables from a "trivial many" variables.

An experiment performance component 32 runs the number of experiments established for the algorithm by the DoE component 30. The experiment performance component 32 comprises a performance metric component 34 that evaluates the results of the experiments run for the algorithm using a performance metric. The performance metric contains evaluation criteria for comparing the results to a baseline algorithm. Examples of some performance metrics may include the solution specificity, sensitivity, robustness, execution time, false positives, false negatives, true positives, true negatives, false classifieds, etc. The baseline algorithm is an algorithm that would provide the best (by some metric) results if the algorithm undergoing assessment was not available. If no baseline algorithm exists, the first path through the newly developed algorithm (before improvements are being made) can be used as a baseline. The experiment performance component 32 also comprises an algorithm adjustment component 36 that adjusts the logic or parameters of the algorithm if the results determined by the performance metric component 34 are unacceptable. In particular, the algorithm adjustment component 36 changes the algorithm and logic or parameters if the results determined by the performance metric component 34 are unacceptable. In this case, the experiment performance component 32 will then run the experiments for the adjusted algorithm and logic or parameters.

A module insertion component 38 inserts an additional module into the algorithm if the results determined by the performance metric component 34 are acceptable. The experiment performance component 32 then runs the experiments for the algorithm including the inserted module. The module insertion component 38 will continue to add more modules into the algorithm until performance is satisfactory. Likewise, the experiment performance component 32 will run the experiments for the algorithm including the inserted modules. This iterative process enables a designer to assess the performance of the algorithm as each additional component is inserted.

A simulation component 40 simulates the behavior of the algorithm using the results obtained from the experiment performance component 32. The simulation component 40 uses a Monte Carlo simulation to simulate the behavior of the algorithm. A Monte Carlo simulation is a well-known simulation that randomly generates values for uncertain variables over and over to simulate an environment in which a population or study exists. The Monte Carlo simulation also identifies sources of variation, relationships between covariates and links inputs to outputs. In this disclosure, the Monte Carlo simulation component 40 simulates the behavior of the algorithm on a full design space. In addition, the Monte Carlo simulation component 40 comprises a plurality of confusion matrices. A confusion matrix contains information indicative of classifier performance. In particular, the confusion matrix is defined as an n×n matrix where n is the number of classes considered by the classifier. The confusion matrix is arranged such that each of the rows contain true results for a particular class. The columns contain the output of the classifier. The resulting matrix shows the correctly classified output on the diagonal as the true positives (TP) and true negatives (TN). If the first class is dedicated to be the normal class (or null fault), then the following definitions can be made: The first row except the first entry contains the false positives (FP). The first column except the first entry contains the false negatives (FN). The off-diagonal entries except the first column and the first row contain the falsely classified (FC) classifier results. The confusion matrix can be normalized by dividing each entry of a row by the sum of the entries of the respective row. This provides a convenient way to read off the performance metrics.

A simulation performance component 44 evaluates the performance of the simulation for the algorithm. In particular, the simulation performance component 44 determines if the results of the simulation are acceptable. The criteria for determining whether the simulation results are acceptable will vary according to the algorithm and the user performing the assessment of the algorithm. If the results are acceptable, then the algorithm assessment is over. The simulation performance component also comprises an algorithm adjustment component 46 that adjusts the logic or the parameters of the algorithm if the results are unacceptable. If the parameters of the algorithm are adjusted, then the simulation component 40 runs the simulation for the system including the portion of the adjusted algorithm. The simulation performance component 44 then evaluates the performance of this simulation. This process (i.e., adjusting logic or parameters and running simulation) continues until the simulation performance component 44 determines that the results are acceptable.

Figure 3:
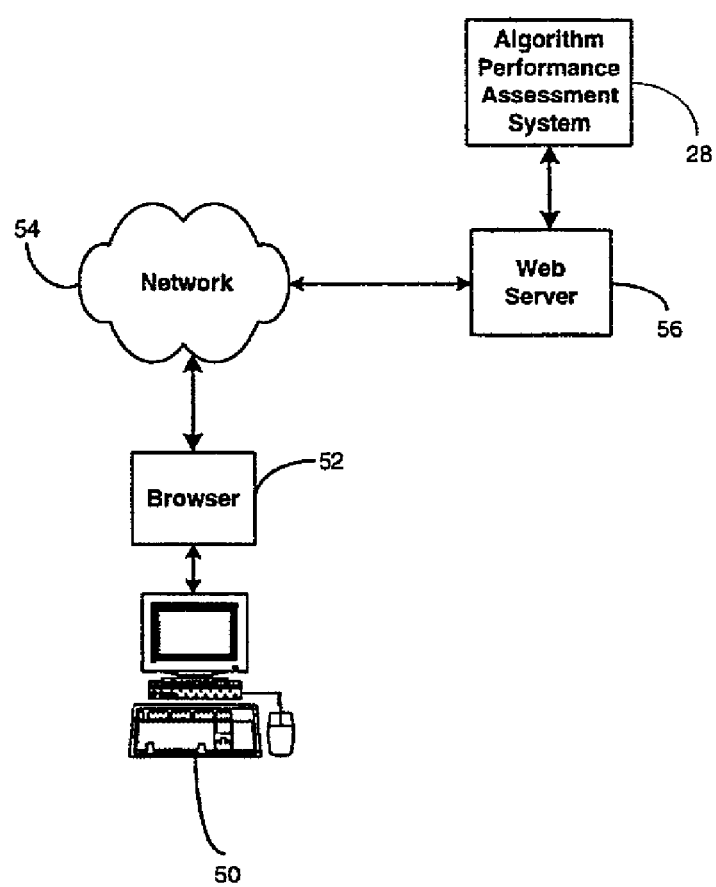
FIG. 3 shows an architectural diagram of a system that implements the algorithm performance assessment system shown in FIG. 2.

FIG. 3 shows an architectural diagram of a system 48 that implements the algorithm performance assessment system 28 shown in FIG. 2. In FIG. 3, a computing unit 50 allows a user to access the algorithm performance assessment system 28. The computing unit 50 can take the form of a hand-held digital computer, personal digital assistant computer, notebook computer, personal computer or workstation. The user uses standard output to a window or a web browser 52 such as Microsoft INTERNET EXPLORER, Netscape NAVIGATOR or Mosaic to locate and display the algorithm performance assessment system 28 on the computing unit 50. A communication network 54 such as an electronic or wireless network connects the computing unit 50 to the algorithm performance assessment system 28. In particular, the computing unit 50 may connect to the algorithm performance assessment system 28 through a private network such as an extranet or intranet or a global network such as a WAN (e.g., Internet). As shown in FIG. 3, the algorithm performance assessment system 28 is provided by a server 56, which comprises a web server that serves the algorithm performance assessment system 28.

If desired, the system 48 may have functionality that enables authentication and access control of users accessing the algorithm performance assessment system 28. Both authentication and access control can be handled at the web server level by the algorithm performance assessment system 28 itself, or by commercially available packages such as Netegrity SITEMINDER. Information to enable authentication and access control such as the user names, location, telephone number, organization, login identification, password, access privileges to certain resources, physical devices in the network, services available to physical devices, etc. can be retained in a database directory. The database directory can take the form of a lightweight directory access protocol (LDAP) database; however, other directory type databases with other types of schema may be used including relational databases, object-oriented databases, flat files, or other data management systems.

Figure 4:
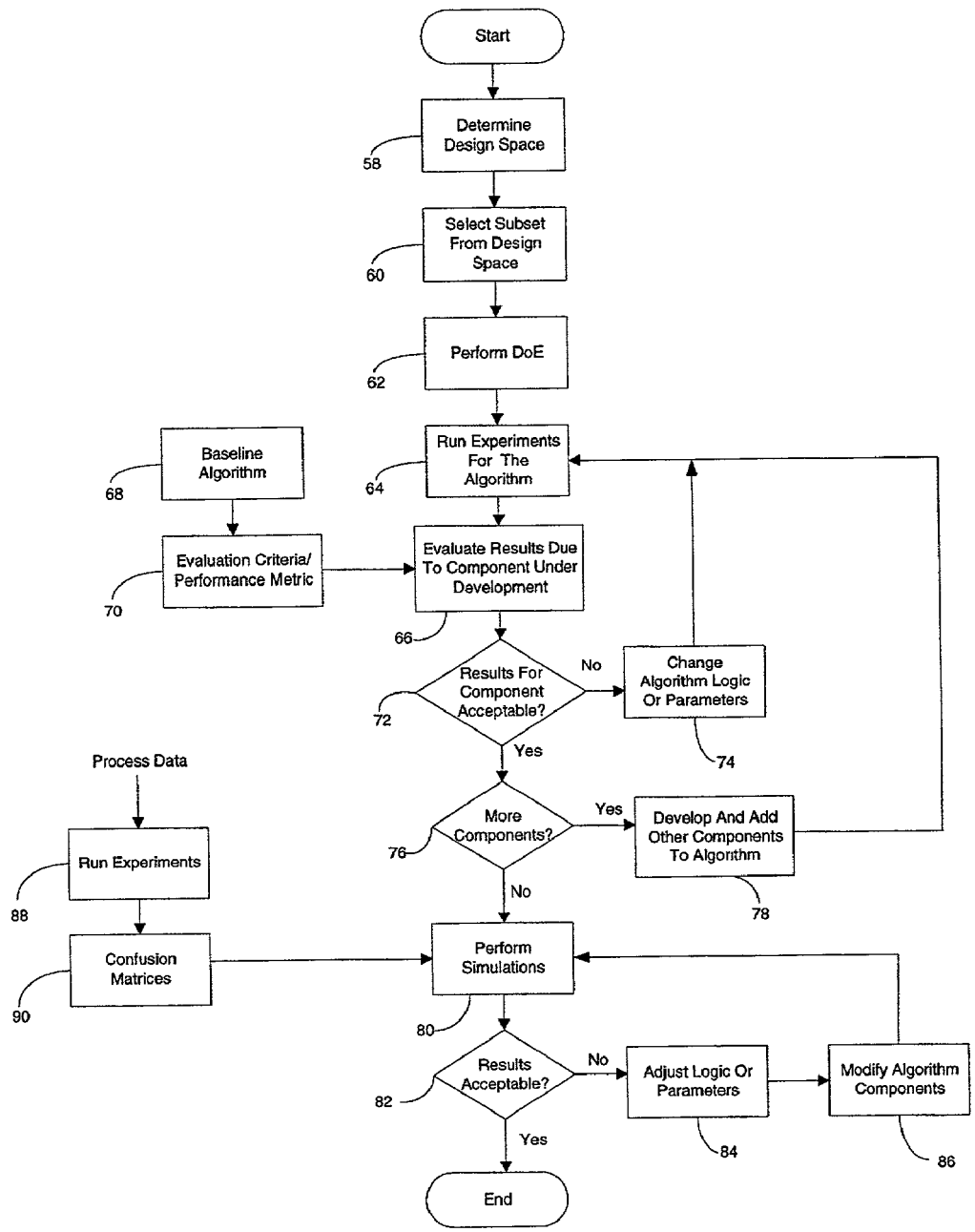
FIG. 4 shows a flow chart describing actions performed by the algorithm performance assessment system shown in FIG. 2 as it operates within the system shown in FIG. 3.

FIG. 4 shows a flow chart describing actions performed by the algorithm performance assessment system 28 shown in FIG. 2 as it operates within the system 48 shown in FIG. 3. The flow chart begins at block 58, where an expert determines a design space and selects a subset of the defined design space at 60 for the algorithm that is undergoing development. The DoE component 30 then performs the DoE at 62. As mentioned above, performing the DoE includes establishing an acceptable number of experiments and choosing an appropriate level of experiments for analyzing the algorithm. Next, the experiment performance component 32 runs the number of experiments established for the algorithm at 64. These experiments reflect specific cases of system input behavior which is then simulated accordingly. The experiment performance component 32 then evaluates the results of the experiments run for the algorithm at 66. In particular, it evaluates the contribution of the algorithm component under development. This includes using a baseline algorithm provided at 68 and a performance metric provided at 70 and comparing the results obtained at 64 to the baseline algorithm and performance metric.

If the results as determined at 72 are not acceptable, then the algorithm adjustment component 36 adjusts the algorithm logic or the parameters of the algorithm at 74. The experiment performance component 32 then runs the experiments for the adjusted algorithm and logic or parameters at 64. The algorithm performance assessment system 28 then repeats blocks 66–72 until the results are acceptable. Next, the algorithm performance assessment system 28 determines at 76 if there are more algorithm components that need to be developed. If so, then other components are added to the algorithm at 78. The algorithm performance assessment system 28 then repeats blocks 64–78 until there are no more components. The decision to develop more algorithm components is made in part based on the overall performance of the algorithm, availability of resources and any potentially identified performance improving measures.

Once it is determined that there are no more components to insert into the algorithm, then the simulation component 40 simulates the behavior of the system using the results obtained from the experiment performance component 32 at 80. As mentioned above, the simulation component 40 uses a Monte Carlo simulation to simulate the behavior of the input system. The Monte Carlo simulation uses at least one confusion matrix obtained from a plurality of matrices at 90. The confusion matrices are obtained from running experiments at 88 on process data. The Monte Carlo simulation component 40 then uses the confusion matrices to simulate the behavior of the input system. To that end, a z-score is computed, which is a statistical measure indicative of how many standard deviations away from the mean the particular value is located, for a given fault case. The z-score is computed by interpreting the associated entries in the confusion matrix as the area under the curve of a Gaussian distribution from which the z-score is obtained through iterative integration. Then, random values are generated based on the z-score which reflect the behavior shown in the confusion matrices. The simulation performance component 40 evaluates the performance of the simulation for the algorithm at 82. In particular, if the simulation performance component 40 determines that the results of the simulation are acceptable, then the algorithm assessment ends. Otherwise, the algorithm adjustment component 36 adjusts the logic or parameters of the algorithm at 84 and modifies the algorithm components at 86. If the parameters or logic or components of the algorithm are adjusted, then the simulation is repeated at 80. Blocks 82–86 are repeated until the results are acceptable.

The foregoing flow chart of this disclosure shows the functionality and operation of the algorithm performance assessment system 28. In this regard, each block represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Furthermore, the functions can be implemented in programming languages such as Matlab, C, Visual Basic or JAVA; however, other languages can be used.

The above-described algorithm performance assessment system 28 comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The algorithm performance assessment system 28 of this disclosure is suitable for assessing the performance of a multitude of algorithms during development. One example illustrating an application of the algorithm performance assessment system 28 is with the development of an information fusion tool for aggregating outputs from different diagnostic tools. Diagnostic information fusion tools are useful to service providers and manufactures because of their capability to gather and combine results obtained from different diagnostic tools. Generally, the information fusion tools maximize the advantages of each diagnostic tool, while at the same time minimizing their disadvantages. U.S. patent application Ser. No. 09/704,476, filed on Nov. 3, 2000, and entitled "Information Fusion Of Classifiers In Systems With Partial Redundant Information" provides more information on one type of information fusion tool used to diagnose aircraft engine gas path faults. A description of how the algorithm performance assessment system 28 assesses the algorithms associated with the development of this type of information fusion tool follows. Note that the algorithm performance assessment system 28 of this disclosure is not limited to algorithms associated with information fusion tools and can be used in a variety of applications where it is desirable to evaluate the performance of an algorithm during the design process.

Figure 5:
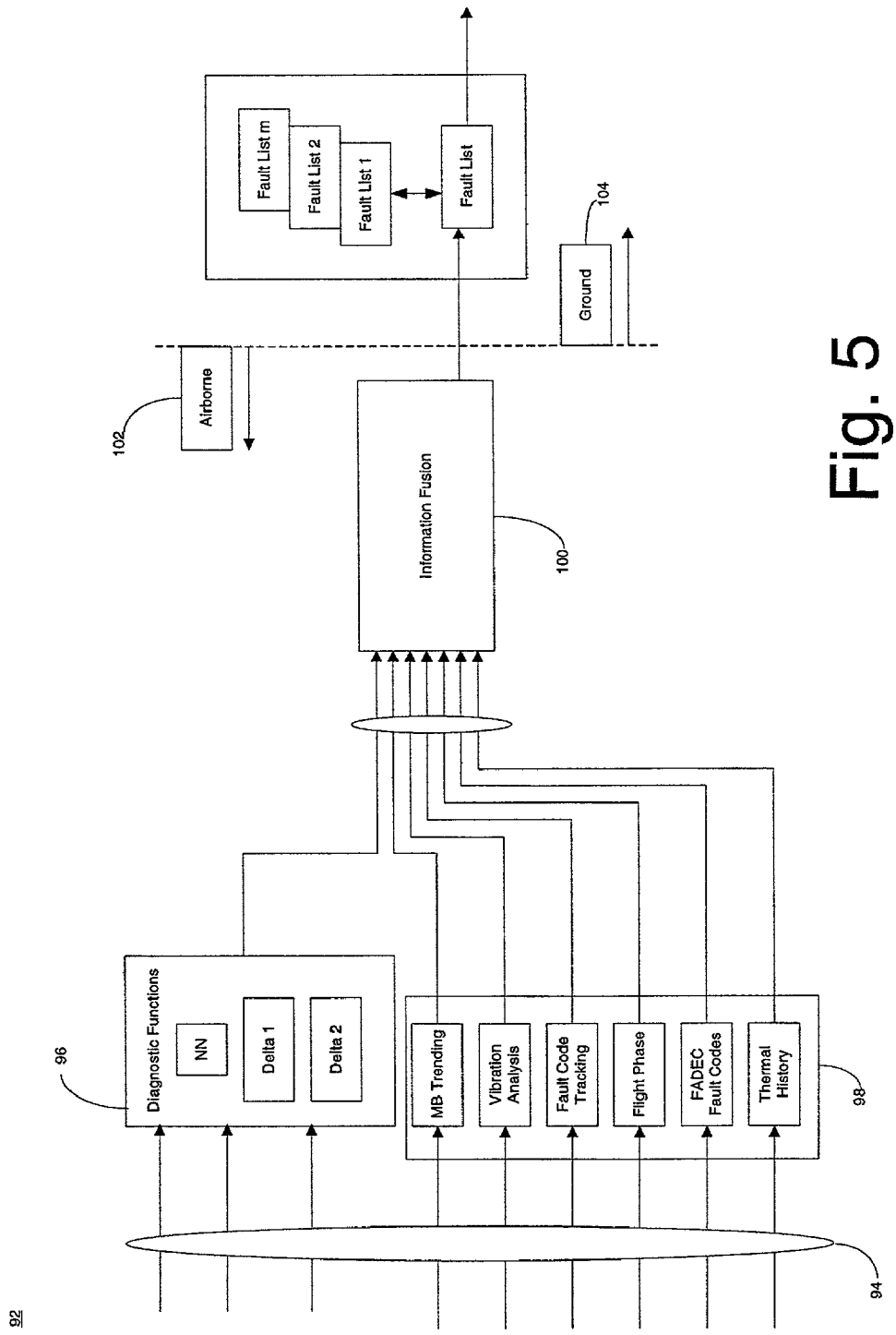
FIG. 5 shows an example of a possible application for the algorithm performance assessment system shown in FIG. 2.

FIG. 5 shows a schematic of a fusion method used to diagnose aircraft engine gas path faults. In FIG. 5, raw engine measurements are provided to the system via an input bus 94 which may be a 1553 bus, an ARINC bus, or other appropriate data transmission medium. Relevant information is sent to the appropriate diagnostic tool such as those depicted in diagnostic functions block 96, and to the appropriate secondary evidence block 98. Outputs from the tools in diagnostic and evidencing blocks 96 and 98 are provided to an information fusion tool 100 as lists of fault identifications and performance detection. The information fusion tool 100 aggregates the multiple fault lists into a single list. This aggregation of fault lists addresses issues such as partial overlap of output information, missing information, conflicting information, different performance levels of the tools inputting the information, and the timeliness of the diagnostic data. As can be seen, by FIG. 5, portions of the fusion tool operation will occur while the aircraft powered by the engines under observation are airborne 102, while other actions are taken when the engines are on the ground 104. The operations taking place on the ground provide further refinement of outputs by comparing fused fault lists to historic and confirmed lists in order to obtain a final fused output.

The secondary evidential information block 98 contains existing or known types of information of system operations for gas turbine engines. For example, the model-based engine trending estimator is an existing piece of software which monitors operation of an engine and makes predictive statements as to the expected lifetime of the engine's operation. A vibration analysis detects the amount of vibration within an engine to determine damage which may be caused by the existence of excessive vibration. FADEC fault codes are standardized codes which are known in the industry to represent states of a system. Intermittent fault code tracking is a mechanism to track the existence of FADEC fault codes during the operation of a specific system. Thermal history measures and records the temperatures reached during operation of an engine.

Figure 6:
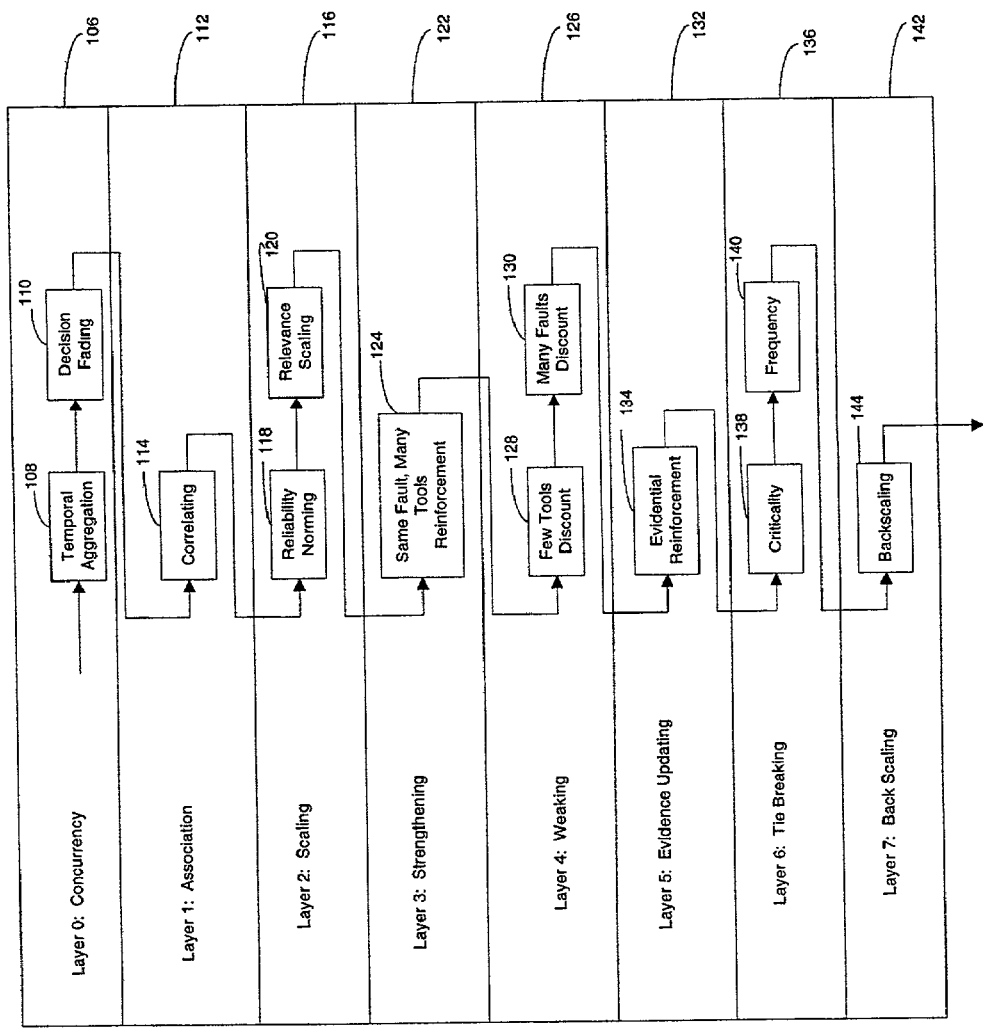
FIG. 6 shows a fusion algorithm process map for the information fusion tool shown in FIG. 5.

FIG. 6 shows a fusion algorithm process map for the information fusion tool shown in FIG. 5. In FIG. 6 there is an architecture that includes eight layers (i.e., layers 0, 1, . . . 7). The first layer is a concurrency layer 106, which is a pre-processing step to the main fusion operations. The concurrency layer 106 uses a temporal aggregation module 108 to perform aggregation of information over time and collect information before the main information fusion process is triggered. In addition, the concurrency layer 106 uses a decision fading module 110 to perform an information fading operation when certain temporal conditions are met. An association layer 112 exploits information about preferred misclassifications of a classification tool using a correlating module 114. A scaling layer 116 uses a reliability forming module 118 and relevance scaling module 120 to integrate a priori information regarding the performance of a classification tool. A strengthening layer 122 reinforces an opinion about a class when several classification tools indicate the same state of a class, such as the existence of a fault. The strengthening layer 122 uses a reinforcement module 124 to accomplish this process. A weakening layer 126 discounts information if several tools disagree on the classification state and it also discounts information if any classification tool indicates several classes at the same time, by use of a few tools discount module 128 and a many faults discount module 130.

An evidence updating layer 132 incorporates secondary evidential information, which is not generated by a classification tool, via an evidential reinforcement module 134. This type of information is used only to support a classification state, not to discount a classification state. A tie-breaking layer 136 deals with high ranking system states (e.g., faults) having similar confidence levels. It employs two strategies: one is to provide a higher weight value to a class that traditionally occurs more often (i.e., a frequency module 140); the other is to weigh a class state (e.g., a fault) higher if it is more critical to successful operation of the system (i.e., a criticality module 138). A backscaling layer 142 performs a transformation by using a backscaling module 144, which makes the fused information interpretable to an end user. U.S. patent application Ser. No. 09/704,476, filed on Nov. 3, 2000, and entitled "Information Fusion Of Classifiers In Systems With Partial Redundant Information" provides more information on this fusion algorithm process map.

A description of how the algorithm performance assessment system 28 can be used to design an information fusion tool such as the one shown in FIGS. 5 and 6 follows. To design this type of information fusion tool one should establish that each heuristic implemented in the layered architecture contributes to an improvement of the result. To that end, a designer can break down the development process into smaller steps and adapt a strategy of complete design cycles for each heuristic. That is, each step encompasses iterations of conception, implementation, and testing. This development process reduces the re-design necessary after completion of the whole fusion architecture, which at that stage would be more difficult because the influence of individual heuristics would be masked in the overall architecture. At the onset, it is not clear what effect the addition of new modules of the algorithm will have on the overall performance and whether the chosen implementation of that heuristic will move the error into the desired direction. Similarly, the parameters are not known beforehand and at least a coarse tuning is needed to be carried out for each heuristic.

The first step in using the algorithm performance assessment system 28 to evaluate the design of such an information fusion tool is to have the designer determine the problem space and select a subset from this space. In this example, assume that the designer selects 2 diagnostic tools, 1 evidential tool and 2 possible fault states from a problem space of 3 diagnostic tools, 5 evidential tools and 7 fault states with continuous-valued variables. Each one of the states in the subset is then limited to take on 3 possible confidence values. This amounts to 729 solutions. Even for a very constrained problem such as this one, 729 is a number too large for expert evaluation and hence will be reduced using the DoE. In this example, a half factorial DoE is preferable for providing a conceptual set of faults for the entire design space. In particular, the half factorial DoE cuts 729 solutions to 45 experiments. Table 1 shows the results of the 45 experiments and the results of expert evaluation.

TABLE 1

| DoE set and expert specified target output | | | | | | | |
|---|---|---|---|---|---|---|---|
| Tool A Fault 1 | Tool B Fault 1 | Evidence Fault 1 | Tool A Fault 2 | Tool B Fault 2 | Evidence Fault 2 | Target 1 | Target 2 |
| 0 | 0 | 0 | 0 | 0 | 0 | 0 | 0 |
| 1 | 0 | 0 | 0 | 0 | 1 | 0.6 | 0 |
| 0 | 1 | 0 | 0 | 0 | 1 | 0.3 | 0 |
| 1 | 1 | 0 | 0 | 0 | 0 | 0.9 | 0 |
| 0 | 0 | 1 | 0 | 0 | 1 | 0 | 0 |
| 1 | 0 | 1 | 0 | 0 | 0 | 0.8 | 0 |
| 0 | 1 | 1 | 0 | 0 | 0 | 0.4 | 0 |
| 1 | 1 | 1 | 0 | 0 | 1 | 1 | 0 |
| 0 | 0 | 0 | 1 | 0 | 1 | 0 | 0.1 |
| 1 | 0 | 0 | 1 | 0 | 0 | 0.5 | 0 |
| 0 | 1 | 0 | 1 | 0 | 0 | 0.3 | 0 |
| 1 | 1 | 0 | 1 | 0 | 1 | 0.9 | 0.1 |
| 0 | 0 | 1 | 1 | 0 | 0 | 0 | 0 |
| 1 | 0 | 1 | 1 | 0 | 1 | 0.5 | 0 |
| 0 | 1 | 1 | 1 | 0 | 1 | 0.3 | 0 |
| 1 | 1 | 1 | 1 | 0 | 0 | 1 | 0 |
| 0 | 0 | 0 | 0 | 1 | 1 | 0 | 0.3 |
| 1 | 0 | 0 | 0 | 1 | 0 | 0.5 | 0.2 |
| 0 | 1 | 0 | 0 | 1 | 0 | 0.2 | 0.1 |
| 1 | 1 | 0 | 0 | 1 | 1 | 0.8 | 0.2 |

TABLE 1-continued

DoE set and expert specified target output

| Tool A Fault 1 | Tool B Fault 1 | Evidence Fault 1 | Tool A Fault 2 | Tool B Fault 2 | Evidence Fault 2 | Target 1 | Target 2 |
|---|---|---|---|---|---|---|---|
| 0 | 0 | 1 | 0 | 1 | 0 | 0 | 0.2 |
| 1 | 0 | 1 | 0 | 1 | 1 | 0.5 | 0.1 |
| 0 | 1 | 1 | 0 | 1 | 1 | 0.3 | 0.2 |
| 1 | 1 | 1 | 0 | 1 | 0 | 0.9 | 0.1 |
| 0 | 0 | 0 | 1 | 1 | 0 | 0 | 0.6 |
| 1 | 0 | 0 | 1 | 1 | 1 | 0.4 | 0.5 |
| 0 | 1 | 0 | 1 | 1 | 1 | 0 | 0.4 |
| 1 | 1 | 0 | 1 | 1 | 0 | 0.6 | 0.4 |
| 0 | 0 | 1 | 1 | 1 | 1 | 0 | 0.7 |
| 1 | 0 | 1 | 1 | 1 | 0 | 0.5 | 0.5 |
| 0 | 1 | 1 | 1 | 1 | 0 | 0.2 | 0.5 |
| 1 | 1 | 1 | 1 | 1 | 1 | 0.8 | 0.5 |
| 0 | 0.5 | 0.5 | 0.5 | 0.5 | 0.5 | 0.3 | 0.3 |
| 1 | 0.5 | 0.5 | 0.5 | 0.5 | 0.5 | 0.7 | 0.3 |
| 0.5 | 0 | 0.5 | 0.5 | 0.5 | 0.5 | 0.3 | 0.3 |
| 0.5 | 1 | 0.5 | 0.5 | 0.5 | 0.5 | 0.5 | 0.2 |
| 0.5 | 0.5 | 0 | 0.5 | 0.5 | 0.5 | 0.4 | 0.3 |
| 0.5 | 0.5 | 1 | 0.5 | 0.5 | 0.5 | 0.4 | 0.3 |
| 0.5 | 0.5 | 0.5 | 0 | 0.5 | 0.5 | 0.4 | 0.2 |
| 0.5 | 0.5 | 0.5 | 1 | 0.5 | 0.5 | 0.4 | 0.4 |
| 0.5 | 0.5 | 0.5 | 0.5 | 0 | 0.5 | 0.4 | 0.3 |
| 0.5 | 0.5 | 0.5 | 0.5 | 1 | 0.5 | 0 | 0.4 |
| 0.5 | 0.5 | 0.5 | 0.5 | 0.5 | 0 | 0.4 | 0.3 |
| 0.5 | 0.5 | 0.5 | 0.5 | 0.5 | 1 | 0.4 | 0.3 |
| 0.5 | 0.5 | 0.5 | 0.5 | 0.5 | 0.5 | 0.4 | 0.3 |

The columns labeled "Target 1" and "Target 2" contain the result of the expert evaluation, which represents the diagnosis for Fault 1 and Fault 2, respectively. The DoE in this example is defined as a "bottom-up DoE" because the diagnostic expert is exposed only to the tool output without knowledge of the faults.

Next, the algorithm performance assessment system 28 evaluates the results of the experiments using a performance metric and a baseline algorithm. In this example, an index aggregating the weighted components of false positives, false negatives, and false classifieds, or any other suitable metric relative to a baseline algorithm can be used as the performance metric, however, other metrics such as sum squared error (SSE), total error rate (TER), total success rate (TSR), can be used. The baseline algorithm may comprise a benchmark algorithm that performed a maximum wins strategy on transformed and normalized input scaled by the a priori reliability of the diagnostic tool. In addition, an overall performance index that weighs the individual components false positives (FP), false negatives (FN), and false classified (FC) is used. The weightings of the individual components are driven by the following equation:

$$0.6*(1-FP)+0.3*(1-FN)+0.1*(1-FC)$$

In this example, the benchmark performance index is set to zero. Therefore, an increase in performance is measured as the fraction of improvement from that baseline to perfect performance, expressed in percent. The development process comprises the iterative addition of new algorithm components and refinement of existing components. In this example, the layers in the information fusion architecture roughly represent the final set of components. Each addition or change is then subjected to the evaluation process. Only components that improve the performance index are included in the overall architecture, thus allowing immediate evaluation. This iterative evaluation process continues until all the results for all of the components of the algorithm are acceptable.

Once all the results are acceptable the algorithm performance assessment system 28 simulates the actual system fault states ("top down") for the full input set with 3 diagnostic tools, 5 evidential tools, and 7 fault states to fine tune the algorithm and parameters. The Monte Carlo simulation allows each fault state to take on any value between 0 and 1 per architecture design requirements. The confusion matrices are used to create a system response that is indicative of realistic tool behavior. Table 2 shows an example of a confusion matrix that can be used in the simulation of the information fusion tool.

TABLE 2

Confusion Matrix

|  | $\hat{F}_0$ | $\hat{F}_1$ | $\hat{F}_2$ | $\hat{F}_3$ | $\hat{F}_4$ | $\hat{F}_5$ | $\hat{F}_6$ |
|---|---|---|---|---|---|---|---|
| $F_0$ | 0.832 | 0.023 | 0.039 | 0.035 | 0.035 | 0.013 | 0.023 |
| $F_1$ | 0.258 | 0.696 | 0.019 | 0.012 | 0.005 | 0.005 | 0.005 |
| $F_2$ | 0.313 | 0.011 | 0.582 | 0.029 | 0.027 | 0.014 | 0.024 |
| $F_3$ | 0.325 | 0.010 | 0.029 | 0.573 | 0.052 | 0.007 | 0.004 |
| $F_4$ | 0.382 | 0.007 | 0.027 | 0.041 | 0.495 | 0.007 | 0.041 |
| $F_5$ | 0.094 | 0.001 | 0.013 | 0.005 | 0.012 | 0.847 | 0.028 |
| $F_6$ | 0.234 | 0.007 | 0.032 | 0.004 | 0.058 | 0.026 | 0.639 |

In this example, the confusion matrices of the diagnostic tools are the primary sources of a priori information for the information fusion tool. As a performance measure for the individual diagnostic tools, the confusion matrices list the observed faults versus the estimated faults. Because all faults are enumerated, it is possible to obtain information not only about the correctly classified states, but also about the false positives (FP), false negatives (FN), and false classified (FC) states. In Table 2, the rows list the actual faults, the columns list the estimated faults. Note that the fault $F_0$ represents the no fault condition. The diagonal entries of the confusion matrix represent the correctly classified cases. The first row, except the first entry, contains the FP state. The first column, except the first entry, contains the FN state. The off-diagonal elements, except the FP and FN states, are the FC states. Table 2 also shows the normalized confusion matrix for a diagnostic tool where each entry of a row was divided by the number of experiments for each class (i.e., the sum of the entries of the respective rows). The faults are denoted as $F_n$ where n={0, . . . , 6}.

Figure 7:
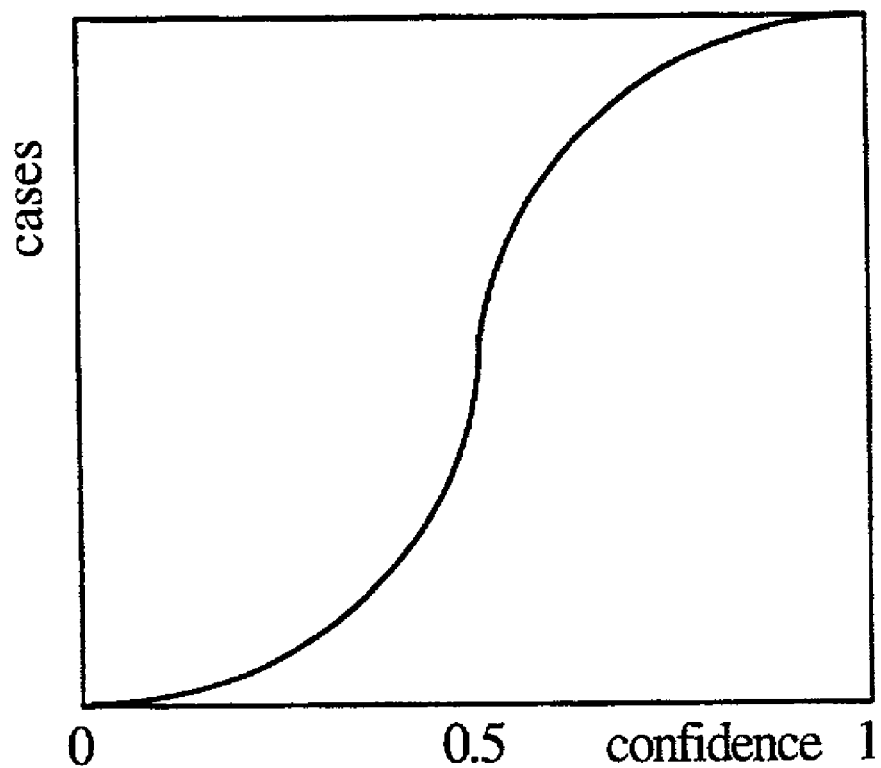
FIG. 7 illustrates an example of simulating a diagnostic tool output for the information fusion tool shown in FIG. 5 with the algorithm performance assessment system shown in FIG. 2.

The Monte Carlo simulation in this example generally comprises three parts. One part includes computing the z-score, which as mentioned above, is a statistical measure indicative of how many standard deviations away from the mean the particular value is located, for a given a fault case. The z-score is computed by interpreting the associated entries in the confusion matrix as the area under the curve of a Gaussian distribution from which the z-score is obtained through iterative integration. Another part of the Monte Carlo simulation includes assigning random values based on the z-score. As an example, assume that the reliability of a diagnostic tool for a particular fault is 95%. This value is obtained from the diagonal entries of the confusion matrix, e.g., 0.95. The interpretation is that the diagnostic tool classifies correctly in 95% of the cases. Therefore, 95% of the output cases are generated between 0.5 and 1 and 5% of the output cases are generated between 0 and 0.5. FIG. 7 illustrates an example curve that can be used to simulate a diagnostic tool output. The third part of the simulation is to carry out the system run, in this case the information fusion. These parts of the Monte Carlo simulation are repeated many times until statistically meaningful results have been obtained. The results are then compiled in confusion matrix format.

After performing the simulation, the simulation performance component 44 determines if the results are acceptable. The results are acceptable if the performance index is greater than a predetermined threshold. If necessary, the logic or parameters and/or algorithm for a particular heuristic in the algorithm are adjusted. The process of determining if the simulation results are acceptable is repeated until a desired system response is obtained.

It is apparent that there has been provided in accordance with this invention, an algorithm performance assessment system, method and computer product. While the invention has been particularly shown and described in conjunction with a preferred embodiment thereof, it will be appreciated that variations and modifications can be effected by a person of ordinary skill in the art without departing from the scope of the invention.

The invention claimed is:

1. A system for assessing the performance of an algorithm during development, comprising:
   a design of experiments component that establishes an acceptable number of experiments for analyzing the algorithm;
   an experiment performance component that runs the established number of experiments for the algorithm, wherein the experiment performance component comprises a performance metric component that evaluates the results of the experiments run for the algorithm, the evaluation comprising comparing the results with a baseline algorithm and a performance metric; and
   a simulation component that simulates the behavior of the algorithm using results from the experiment performance component.

2. The system according to claim 1, wherein the design of experiments component selects an appropriate level of experiments for analyzing the algorithm.

3. The system according to claim 2, wherein the design of experiments component selects the appropriate level of experiments from at least one of full factorial experiments, fractional factorial experiments or screening experiments.

4. The system according to claim 1, wherein the experiment performance component comprises an algorithm adjustment component that adjusts logic or parameters of the algorithm for unacceptable results.

5. The system according to claim 4, wherein the experiment performance component runs the established number of experiments for the algorithm after adjustment of logic or parameters.

6. The system according to claim 1, further comprising a module insertion component that inserts a module into the algorithm.

7. The system according to claim 6, wherein the experiment performance component runs the established number of experiments for the algorithm including the inserted module.

8. The system according to claim 1, wherein the simulation component performs a Monte Carlo simulation.

9. The system according to claim 1, wherein the simulation component uses at least one confusion matrix to simulate the behavior of the algorithm.

10. The system according to claim 1, further comprising a simulation performance component that evaluates the performance of the simulation of the algorithm.

11. The system according to claim 10, wherein the simulation performance component comprises an algorithm adjustment component that adjusts logic or parameters of the algorithm for unacceptable results, wherein the adjustment is performed during the development of the algorithm.

12. The system according to claim 11, wherein the simulation component runs the simulation for the algorithm after adjustment of logic or parameters.

13. A system for assessing the performance of an algorithm during development, comprising:
   a design of experiments component that establishes an acceptable number of experiments for analyzing the algorithm;
   an experiment performance component that runs the established number of experiments for the algorithm, wherein the experiment performance component comprises a performance metric component that evaluates the results of the experiments run for the algorithm, the evaluation comprising comparing the results with a baseline algorithm and a performance metric;
   a simulation component that simulates the behavior of the algorithm using results from the experiment performance component; and
   a simulation performance component that evaluates the performance of the simulation for the algorithm.

14. The system according to claim 13, wherein the design of experiments component selects an appropriate level of experiments for analyzing the algorithm.

15. The system according to claim 14, wherein the design of experiments component selects the appropriate level of experiments from at least one of full factorial experiments, fractional factorial experiments or screening experiments.

16. The system according to claim 13, wherein the experiment performance component comprises an algorithm adjustment component that adjusts logic or parameters of the algorithm for unacceptable results.

17. The system according to claim 16, wherein the experiment performance component runs the established number of experiments for the portion of the algorithm after adjustment of parameters.

18. The system according to claim 13, further comprising a module insertion component that inserts a module into the algorithm.

19. The system according to claim 18, wherein the experiment performance component runs the established number of experiments for the algorithm including the inserted module.

20. The system according to claim 13, wherein the simulation component performs a Monte Carlo simulation.

21. The system according to claim 13, wherein the simulation component uses at least one confusion matrix to simulate the behavior of the algorithm.

22. The system according to claim 13, wherein the simulation performance component comprises an algorithm adjustment component that adjusts logic or parameters of the algorithm for unacceptable results, wherein the adjustment is performed during the development of the algorithm.

23. The system according to claim 22, wherein the simulation component runs the simulation for the algorithm after adjustment of logic or parameters.

24. A system for assessing the performance of an algorithm during development, comprising:
    a design of experiments component that establishes an acceptable number of experiments for analyzing the algorithm;
    an experiment performance component that runs the established number of experiments for the algorithm and uses a performance metric to evaluate the results of the experiments, the evaluation comprising comparing the results with a baseline algorithm and the performance metric;
    a Monte Carlo simulation component that simulates the behavior of the algorithm using results from the experiment performance component with a Monte Carlo simulation; and
    a simulation performance component that evaluates the performance of the Monte Carlo simulation for the algorithm.

25. The system according to claim 24, wherein the design of experiments component selects an appropriate level of experiments from at least one of full factorial experiments, fractional factorial experiments or screening experiments.

26. The system according to claim 24, wherein the experiment performance component comprises an algorithm adjustment component that adjusts logic or parameters of the algorithm for unacceptable results.

27. The system according to claim 26, wherein the experiment performance component runs the established number of experiments for the algorithm after adjustment of logic or parameters.

28. The system according to claim 24, wherein the Monte Carlo simulation component uses at least one confusion matrix to simulate the behavior of the algorithm.

29. The system according to claim 24, wherein the simulation performance component comprises an algorithm adjustment component that adjusts logic or parameters of the algorithm for unacceptable results, wherein the adjustment is performed during the development of the algorithm.

30. The system according to claim 29, wherein the simulation component runs the simulation for the algorithm after adjustment of parameters.

31. A system for assessing the performance of an algorithm during development, comprising:
    a design of experiments component that establishes an acceptable number of experiments for analyzing the algorithm;
    an experiment performance component that runs the established number of experiments for the algorithm;
    a performance metric component that evaluates the results of the experiments run for the algorithm, the evaluation comprising comparing the results with a baseline algorithm and a performance metric; and
    an algorithm adjustment component that adjusts logic or parameters of the algorithm for unacceptable results, wherein the adjustment is performed during the development of the algorithm.

32. The system according to claim 31, wherein the design of experiments component selects an appropriate level of experiments for analyzing the algorithm from at least one of full factorial experiments, fractional factorial experiments or screening experiments.

33. The system according to claim 31, wherein the experiment performance component runs the established number of experiments for the algorithm after adjustment of logic or parameters.

34. The system according to claim 31, further comprising a module insertion component that inserts a module into the algorithm.

35. The system according to claim 34, wherein the experiment performance component runs the established number of experiments for the algorithm including the inserted module.

36. A system for assessing the performance of an algorithm during development, comprising:
    a Monte Carlo simulation component that simulates the behavior of the algorithm with a Monte Carlo simulation, wherein the Monte Carlo simulation component uses at least one confusion matrix to simulate the behavior of the algorithm, wherein the Monte Carlo simulation component further computes a z-score based on one or more entries in the confusion matrix, and wherein the z-scores generate random values that reflect the behavior of the algorithm in the confusion matrix;
    a simulation performance component that evaluates the performance of the Monte Carlo simulation for the algorithm; and
    an algorithm adjustment component that adjusts logic or parameters of the algorithm for unacceptable results, wherein the adjustment is performed during the development of the algorithm.

37. The system according to claim 36, wherein the Monte Carlo simulation component runs the simulation for the algorithm after adjustment of logic or parameters.

38. A computer-readable medium storing computer instructions for instructing a computer system to assess the performance of an algorithm during development, the computer instructions comprising:
    using design of experiments to establish an acceptable number of experiments for analyzing the algorithm;
    running the established number of experiments for the algorithm, using a performance metric to evaluate the results of the experiments run for the algorithm, wherein the evaluation comprises comparing the results with a baseline algorithm and the performance metric; and
    simulating the behavior of the algorithm using results from the experiments.

39. The computer-readable medium according to claim 38, wherein the using of design of experiments comprises instructions for selecting an appropriate level of experiments for analyzing the algorithm.

40. The computer-readable medium according to claim 39, wherein the appropriate level of experiments comprise at least one of full factorial experiments, fractional factorial experiments or screening experiments.

41. The computer-readable medium according to claim 38, further comprising instructions for adjusting logic or parameters of the algorithm for unacceptable results.

42. The computer-readable medium according to claim 41, further comprising instructions for running the established number of experiments for the algorithm after adjustment of logic or parameters.

43. The computer-readable medium according to claim 38, further comprising instructions for inserting a module into the algorithm.

44. The computer-readable medium according to claim 43, further comprising instructions for running the established number of experiments for the algorithm including the inserted module.

45. The computer-readable medium according to claim 38, wherein the simulating comprises instructions for using at least one confusion matrix to simulate the behavior of the algorithm.

46. The computer-readable medium according to claim 38, further comprising instructions for evaluating the performance of the simulation for the algorithm.

47. The computer-readable medium according to claim 46, further comprising instructions for adjusting logic or parameters of the algorithm for unacceptable results, wherein the adjustment is performed during the development of the algorithm.

48. The computer-readable medium according to claim 47, further comprising instructions for running the simulation for the algorithm after adjustment of logic or parameters.

49. A computer-readable medium storing computer instructions for instructing a computer system to assess the performance of an algorithm during development, the computer instructions comprising:
using design of experiments to establish an acceptable number of experiments for analyzing the algorithm;
running the established number of experiments for the algorithm, using a performance metric to evaluate the results of the experiments run for the algorithm, wherein the evaluation comprises comparing the results with a baseline algorithm and the performance metric;
simulating the behavior of the algorithm using results from the experiments; and
evaluating the performance of the simulation for the algorithm.

50. The computer-readable medium according to claim 49, wherein the using of design of experiments comprises instructions for selecting an appropriate level of experiments for analyzing the algorithm from at least one of full factorial experiments, fractional factorial experiments or screening experiments.

51. The computer-readable medium according to claim 49, further comprising instructions for adjusting logic or parameters of the algorithm for unacceptable results.

52. The computer-readable medium according to claim 51, further comprising instructions for running the established number of experiments for the algorithm after adjustment of logic or parameters.

53. The computer-readable medium according to claim 49, further comprising instructions for inserting a module into the algorithm.

54. The computer-readable medium according to claim 53, further comprising instructions for running the established number of experiments for the algorithm including the inserted module.

55. The computer-readable medium according to claim 49, wherein the simulation is a Monte Carlo simulation.

56. The computer-readable medium according to claim 49, wherein the simulating uses at least one confusion matrix to simulate the behavior of the algorithm.

57. The computer-readable medium according to claim 49, further comprising instructions for adjusting logic or parameters of the algorithm for unacceptable results, wherein the adjustment is performed during the development of the algorithm.

58. The computer-readable medium according to claim 57, further comprising instructions for running the simulation for the algorithm after adjustment of logic or parameters.

59. A computer-readable medium storing computer instructions for instructing a computer system to assess the performance of an algorithm during development, the computer instructions comprising:
using a design of experiments to establish an acceptable number of experiments for analyzing the algorithm;
running the established number of experiments for the algorithm;
using a performance metric to evaluate the results of the experiments run for the algorithm, wherein the evaluation comprises comparing the results with a baseline algorithm and the performance metric;
using a Monte Carlo simulation to simulate the behavior of the algorithm using results from the performance metric; and
evaluating the performance of the Monte Carlo simulation for the he algorithm.

60. The computer-readable medium according to claim 59, wherein using the design of experiments comprises instructions for selecting an appropriate level of experiments from at least one of full factorial experiments, fractional factorial experiments or screening experiments.

61. The computer-readable medium according to claim 59, further comprising instructions for adjusting logic or parameters of the algorithm for unacceptable results.

62. The computer-readable medium according to claim 61, further comprising instructions for running the established number of experiments for the algorithm after adjustment of logic or parameters.

63. The computer-readable medium according to claim 59, wherein the simulating comprises instructions for using at least one confusion matrix to simulate the behavior of the algorithm.

64. The computer-readable medium according to claim 59, further comprising instructions for adjusting logic or parameters of the algorithm for unacceptable results, wherein the adjustment is performed during the development of the algorithm.

65. The computer-readable medium according to claim 64, further comprising instructions for running the simulation for the algorithm after adjustment of logic or parameters.

66. A computer-readable medium storing computer instructions for instructing a computer system to assess the performance of an algorithm during development, the computer instructions comprising:

using a design of experiments to establish an acceptable number of experiments for analyzing the algorithm;

running the established number of experiments for the algorithm, using a performance metric to evaluate the results of the experiments run for the algorithm, wherein the evaluation comprises comparing the results with a baseline algorithm and the performance metric;

evaluating the results of the experiments run for the algorithm with a performance metric; and adjusting logic or parameters of the algorithm for unacceptable results, wherein the adjustment is performed during the development of the algorithm.

67. The computer-readable medium according to claim 66, wherein the using of design of experiments comprises instructions for selecting an appropriate level of experiments for analyzing the algorithm from at least one of full factorial experiments, fractional factorial experiments or screening experiments.

68. The computer-readable medium according to claim 66, further comprising instructions for running the established number of experiments for the algorithm after adjustment of logic or parameters.

69. The computer-readable medium according to claim 66, further comprising instructions for inserting a module into the algorithm.

70. The computer-readable medium according to claim 69, further comprising instructions for running the established number of experiments for the algorithm including the inserted module.

71. A computer-readable medium storing computer instructions for instructing a computer system to assess the performance of an algorithm during development, the computer instructions comprising:

simulating the behavior of the algorithm with a Monte Carlo simulation, wherein the Monte Carlo simulation uses at least one confusion matrix to simulate the behavior of the algorithm, wherein the Monte Carlo simulation further computes a z-score based on one or more entries in the confusion matrix, and wherein the z-scores generate random values that reflect the behavior of the algorithm in the confusion matrix;

evaluating the performance of the Monte Carlo simulation for the algorithm; and adjusting logic or parameters of the algorithm for unacceptable results, wherein the adjustment is performed during the development of the algorithm.

72. The computer-readable medium according to claim 71, further comprising instructions for running the Monte Carlo simulation for the algorithm after adjustment of logic or parameters.

* * * * *